June 6, 1950 R. E. THOMPSON 2,510,156

AUTOMATIC TUNER

Filed Jan. 19, 1948 7 Sheets-Sheet 1

INVENTOR.
Reynald E. Thompson
BY
Foorman L. Mueller
Atty.

June 6, 1950 R. E. THOMPSON 2,510,156

AUTOMATIC TUNER

Filed Jan. 19, 1948 7 Sheets-Sheet 2

INVENTOR.
Reynald E. Thompson,
BY
Foorman L. Mueller
Atty.

June 6, 1950 R. E. THOMPSON 2,510,156

AUTOMATIC TUNER

Filed Jan. 19, 1948 7 Sheets-Sheet 3

INVENTOR.
Reynald E. Thompson,
BY
Foorman L. Mueller
Atty.

June 6, 1950 R. E. THOMPSON 2,510,156

AUTOMATIC TUNER

Filed Jan. 19, 1948 7 Sheets-Sheet 4

INVENTOR.
Reynald E. Thompson,
BY
Foorman L. Mueller
Atty.

June 6, 1950 R. E. THOMPSON 2,510,156

AUTOMATIC TUNER

Filed Jan. 19, 1948 7 Sheets-Sheet 5

INVENTOR.

Reynald E. Thompson,

BY

Norman L. Mueller

Atty.

June 6, 1950 R. E. THOMPSON 2,510,156

AUTOMATIC TUNER

Filed Jan. 19, 1948 7 Sheets-Sheet 6

INVENTOR.
Reynald E. Thompson,
BY
Foorman L. Mueller
Atty.

June 6, 1950 R. E. THOMPSON 2,510,156

AUTOMATIC TUNER

Filed Jan. 19, 1948 7 Sheets-Sheet 7

INVENTOR.

Reynald E. Thompson,

BY

Foorman L. Mueller

Atty.

Patented June 6, 1950 2,510,156

UNITED STATES PATENT OFFICE 2,510,156

AUTOMATIC TUNER

Reynald E. Thompson, Chicago, Ill., assignor to Motorola, Inc., Chicago, Ill., a corporation of Illinois Application January 19, 1948, Serial No. 3,048

18 Claims. (Cl. 74—10.2)

This invention relates to automatic tuners for radio receivers, particularly of the type in which the tuning elements are adjusted to preselected positions by means of push buttons or analogous members acting through the medium of a carriage and stop mechanism.

In mechanisms of the aforesaid type it is desirable that the tuner function accurately with imperceptable or negligible noise and jarring of the parts, and that it be easily set up or adjusted for selection of the required radio stations or frequency channels. It is also desirable that the dial indicator of the radio set be operated so as to give visual indication of the station selected by the listener when the receiver is being tuned automatically.

A general object of the invention is to provide all of the foregoing features in an automatic tuner of novel construction which is economical to manufacture and dependable in operation.

A further object is to provide a combination push-button and manual tuner in which the manual tuning device is instrumental also in setting the stops of the push-button tuning devices.

A still further object is to provide an improved tuner which is compactly arranged, yet permits ready access to its constituent parts.

A still further object is to eliminate solenoids and the like in the tuner mechanism.

A feature of this invention is that each of the station-selecting push buttons is effective, when pressed, to produce a single back-and-forth excursion of the carriage while concurrently moving one of the carriage stops into an interfering position. The arrangement is such that the carriage always returns against the selected stop from the same direction.

Another feature is that the operation of presetting or adjusting the carriage stops (which commonly is referred to as "setting up the push buttons") is accomplished by pushing each button individually to a special position, then rotating the manual tuning knob until the desired station is tuned in.

Still another feature resides in a novel mechanical movement for interconnecting two parts whose motions are at right angles to each other, whereby the dial indicator is positioned concurrently with the carriage. The relationship between the positions of these two parts is the same regardless of whether the radio set is being tuned manually or automatically.

For a better understanding of the invention, reference is had to the following detailed description thereof taken in conjunction with the accompanying drawings, wherein.

In carrying out the principles of the invention, I have arranged the push-button tuning mechanism in such fashion that pushing a button serves to cock and release a spring-biased carriage, while concurrently selecting one of a plurality of carriage-arresting stops and moving such stop into a position for engaging the carrige on its return stroke. The carriage stops are threaded on screw members which may be rotated to set the stops in preselected positions. Each push button is mounted on a plunger having a portion adapted to cooperate with one of a plurality of elongated rocker members which respectively are mounted pivotally on the screw members, the stops being slidably connected to the rocker members. The plungers respectively are provided with slide portions for engaging and cocking the carriage mechanism whenever a push button is pressed. These slides do not remain latched-in, as do the plungers, but are automatically released at the appropriate time to initiate the return stroke of the carriage, thus bringing the carriage against the selected stop.

The tuner has a manual tuning knob which directly actuates a screw member on which a carriage stop is mounted. This stop is rendered effective by a "manual" push button. Shiftable gear trains interconnect the screw member of the manual constrol device selectively with the screw members supporting the carriage stops of the automatic station-selection push buttons, for setting the latter stops individually when it is desired to "set up the push buttons" for automatic tuning. Each station-selecting push button has a special position in which it may be held to couple its associated screw member with the manual tuning device.

Identification of the station, wave length or frequency channel to which the radio set is automatically tuned by the tuner is afforded by connecting the dial pointed to the aforesaid carriage through the medium of a mechanical movement which relates the carriage displacement to the displacement of the pointer in the same manner as though the set were being tuned manually.

Figure 1:
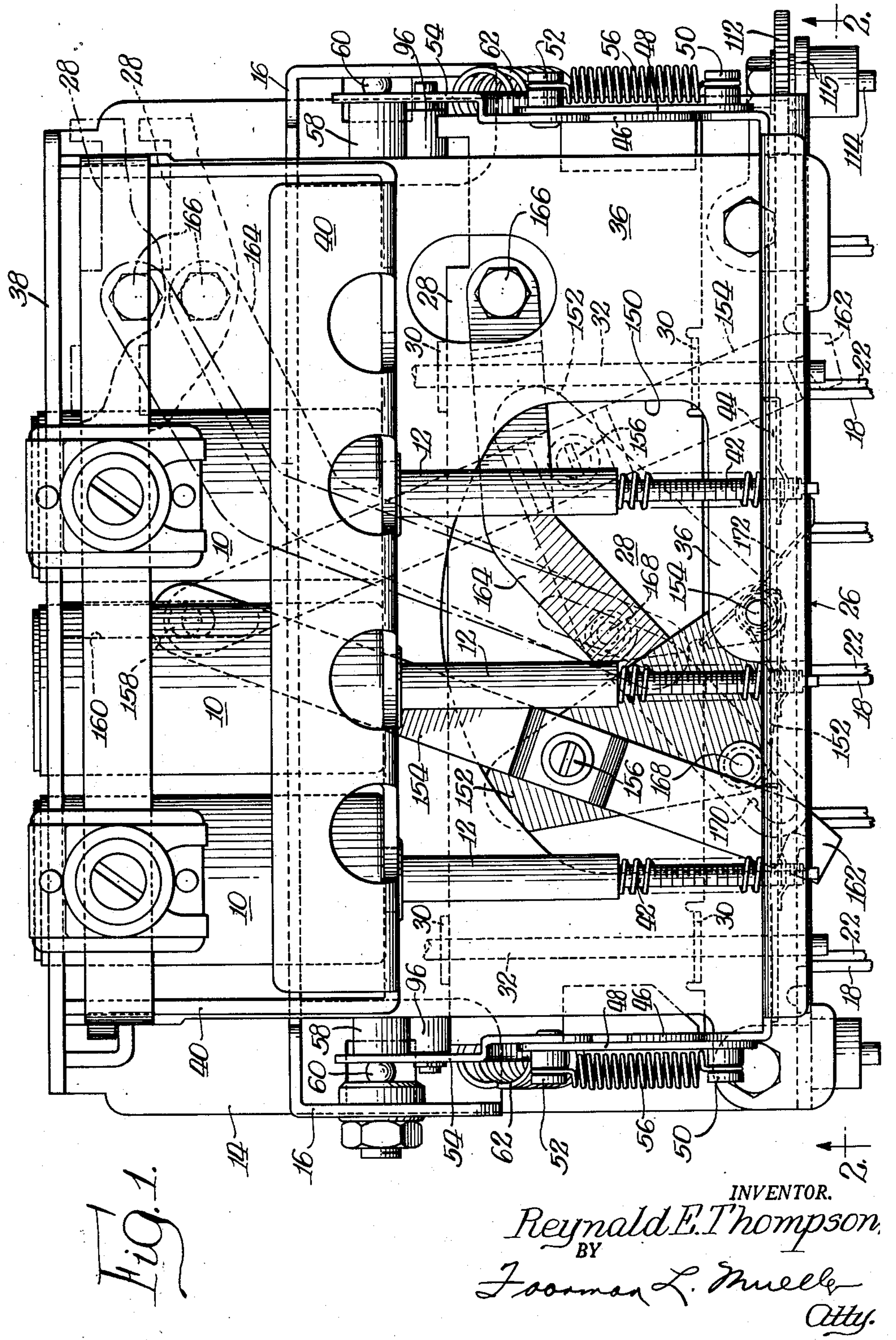
Fig. 1 is a top plan view of a tuning unit constructed in accordance with and embodying the principles of the invention.
Figure 2:
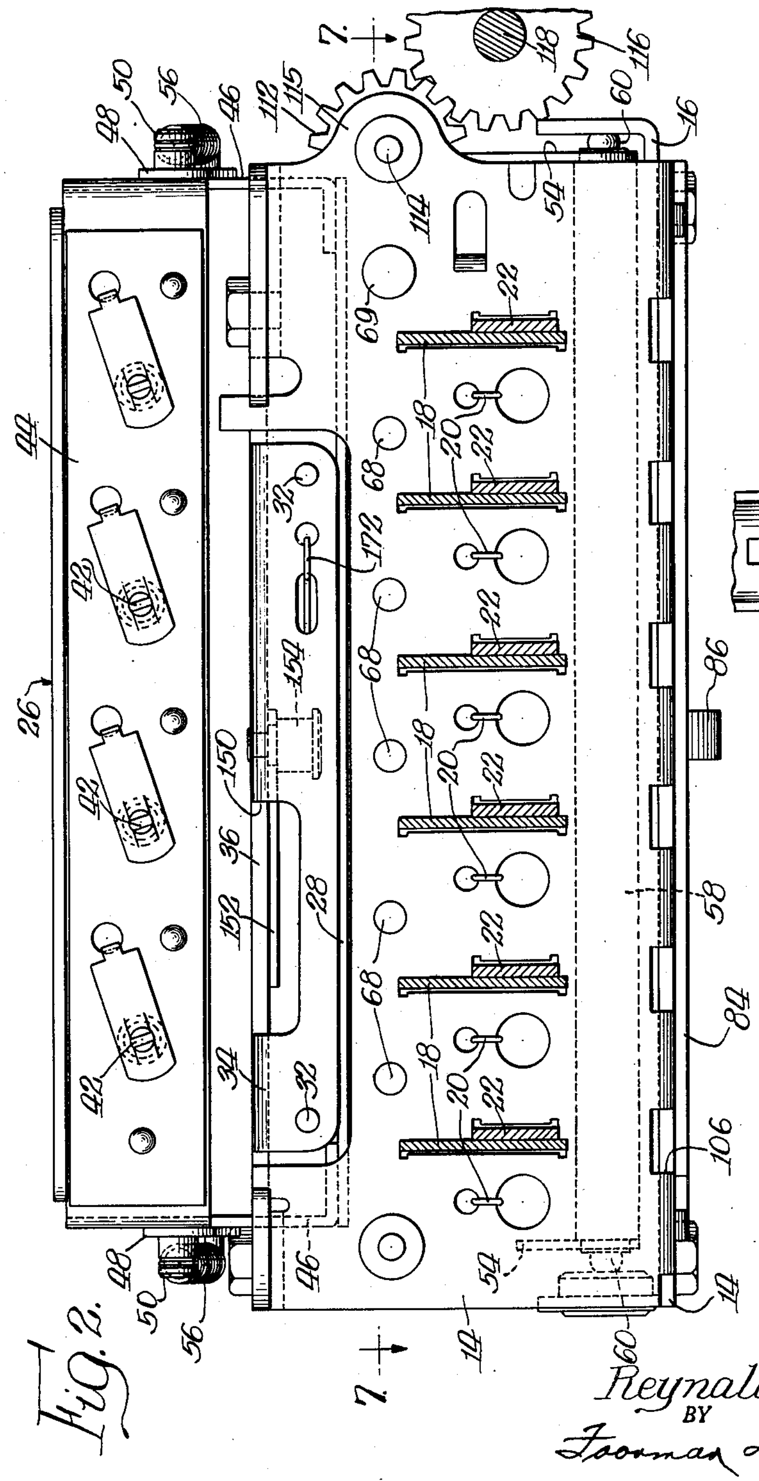
Fig. 2 is a vertical sectional view of the tuning unit taken on the line 2—2 in Fig. 1, looking rearwardly.
Figures 4, 5:
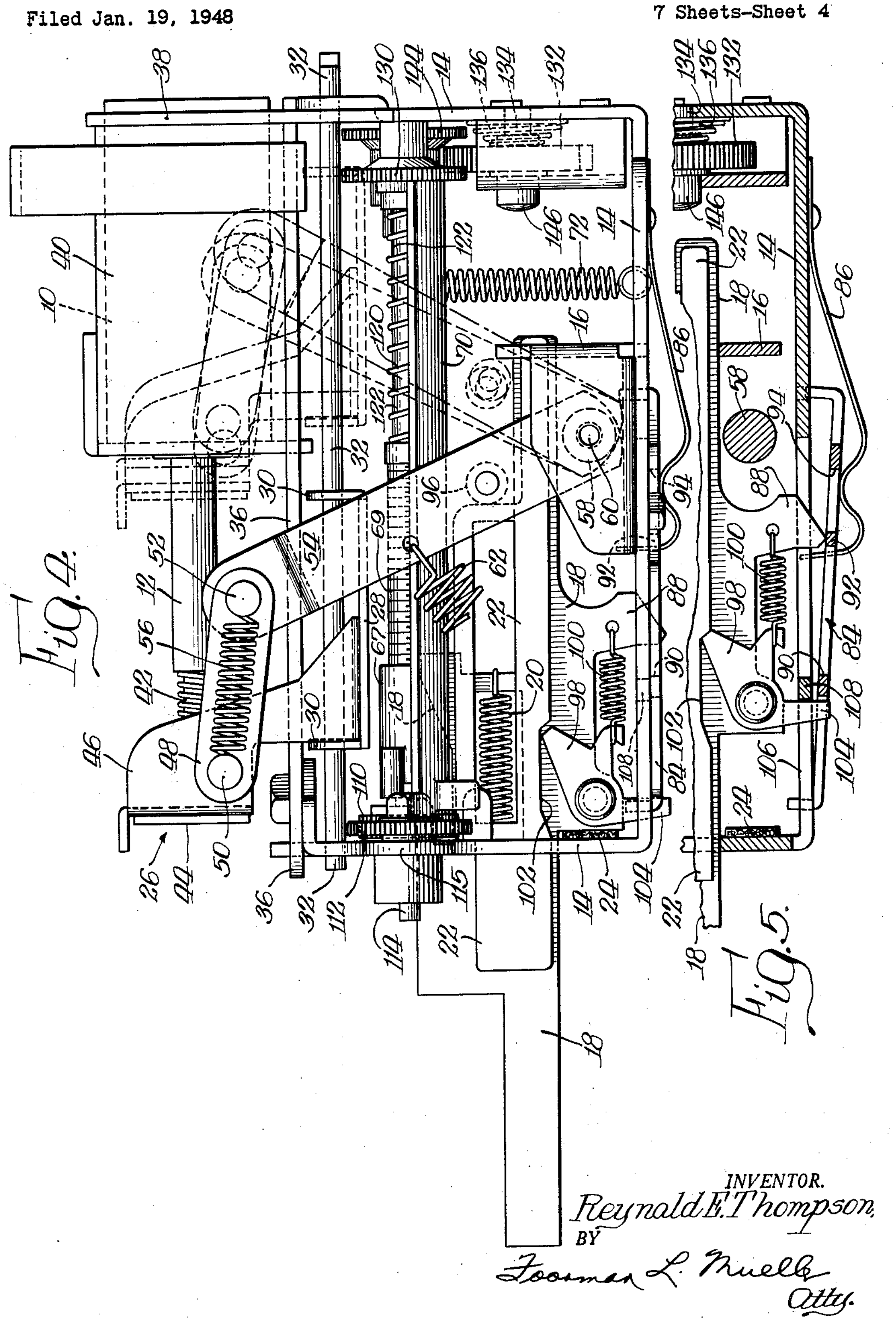
Fig. 4 is an end view looking from the right in Fig. 1.
Fig. 5 is a partial right-end view showing certain parts of the unit moved from the positions thereof shown in Fig. 4.
Figure 6:
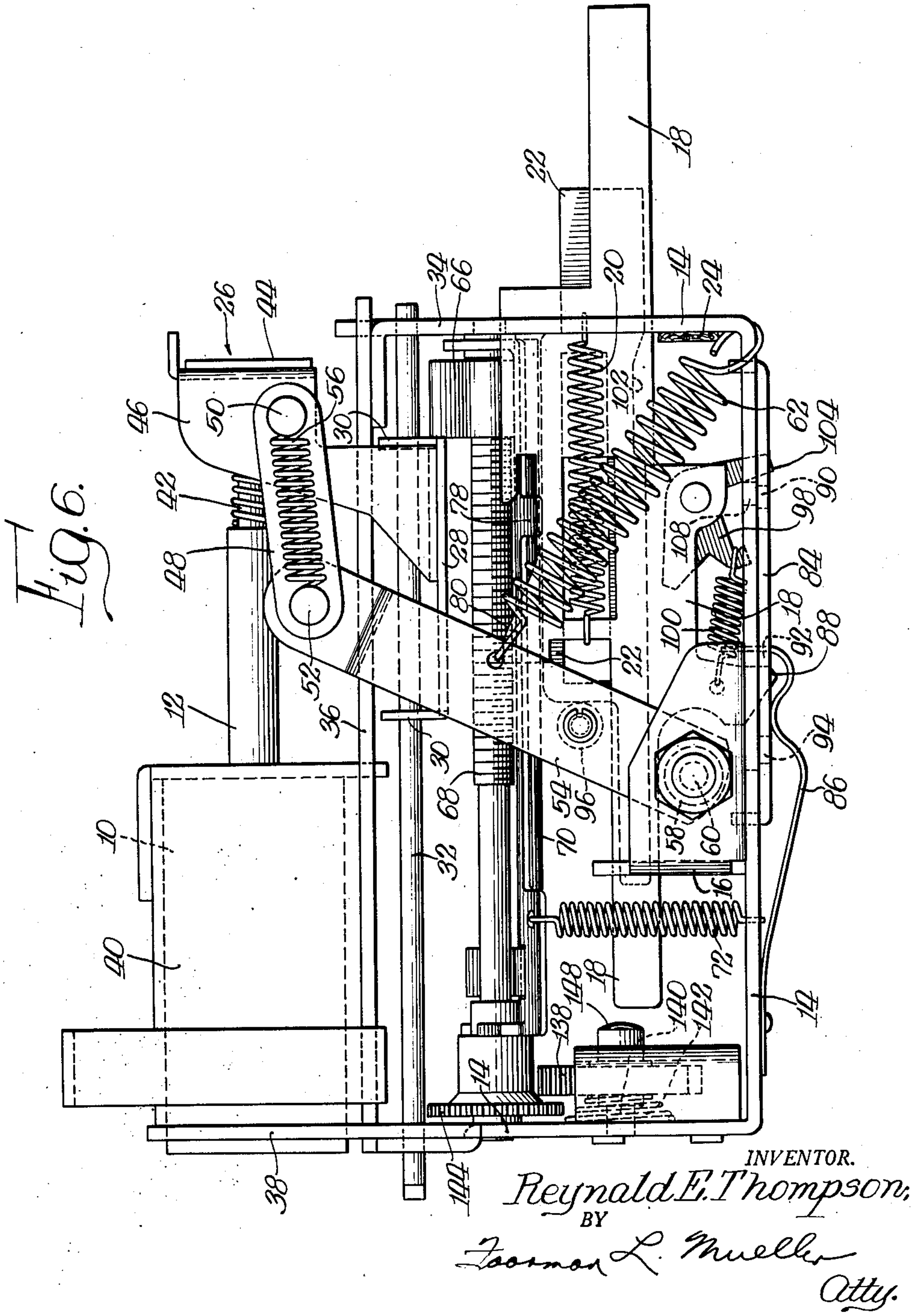
Fig. 6 is an end view looking from the left in Fig. 1.

Referring now to the drawings and particularly Figs. 1, 4 and 6 thereof, the tuning device illustrated therein is adapted to control tuning elements in the form of variable inductors 10 having cores or slugs 12 which are movable lengthwise for varying the inductance of the tuning elements. In these views there are shown three of the inductors 10, which are adapted to be inserted respectively in the oscillator circuit, antenna circuit and an R. F. tuning circuit of a superheterodyne radio receiver. It will be understood, of course, that the invention is not limited to three tuning elements, as it will also accommodate a greater or lesser number as circumstances require.

The tuning unit is adapted to be mounted in the chassis of the radio receiver and is suitably constructed for ready insertion therein and removal therefrom. The frame of the tuner includes a substantially C-shaped piece 14 to which is secured a bracket 16. Plungers 18 (sometimes described as "push rods") extend through slots in the frame piece 14 and the bracket 16, in which they are slidable. These plungers 18 extend horizontally through suitable apertures in the control panel (not shown) of the radio set, and push buttons (not shown) are mounted on the ends of the plungers 18. (In a broad sense, the term "push buttons" may be regarded as denoting both the push buttons themselves and the associated plungers 18, and occasionally the expression is used herein in that manner.) When a push button is pressed inwardly, the connected plunger 18 moves rearwardly against the action of an individual restoring spring 20, Figs. 4 and 6. The plungers 18 are formed from suitable flat stock which is suitably hardened to withstand wear.

Associated with each plunger 18 is a slide 22, shown best in Fig. 4. The slides 22 are disposed respectively adjacent the plungers 18 and are slidably supported in apertures provided therefor in the frame piece 14 and the bracket 16. Shoulders are formed on the slides 22 to limit the sliding movement thereof so that they cannot fall out of the tuning unit. Shoulders or lugs likewise are formed on the plungers 18 to strike against a strip of felt 24, Fig. 4, on an inner surface of the frame piece 14 when the plungers are released to the action of their springs 20. The functions performed by the plungers 18 and slides 22 will become more apparent as the description proceeds.

For actuating the slugs or cores 12 and tuning inductances 10, I provide a carriage structure generally designated 26, Figs. 1, 2, 4 and 6. This carriage structure comprises a carriage proper 28, which consists of a plate having apertured ears 30 for slidably supporting the carriage 28 on guide rods 32 mounted in the tuning unit. One end of each rod 32 extends through holes in a flange 34 of a frame plate 36 which is secured to the frame piece 14. The plate 36 extends horizontally and is anchored to a vertical supporting plate 38 that likewise is secured to the frame piece 14.

A bracket 40 secured to the supporting plate 38 and the frame plate 36 supports the stationary portions of the tuning inductances 10. The movable cores 12 are connected by studs 42 to a movable bracket or extension 44 secured to the carriage 28 and constituting part of the carriage structure 26. Conventional adjusting devices, including the studs 42, enable the positions of the slugs 12 relative to the carriage extension 44 to be adjusted. The tuning inductors 10, slugs 12 and extension 44 are disposed above the frame plate 36, while the carriage 28 is below the frame plate 36. Arms 46 at either end of the extension 44 extend past the side edges of the plate 36 for connecting the extension 44 to the carriage 28.

Figure 7:
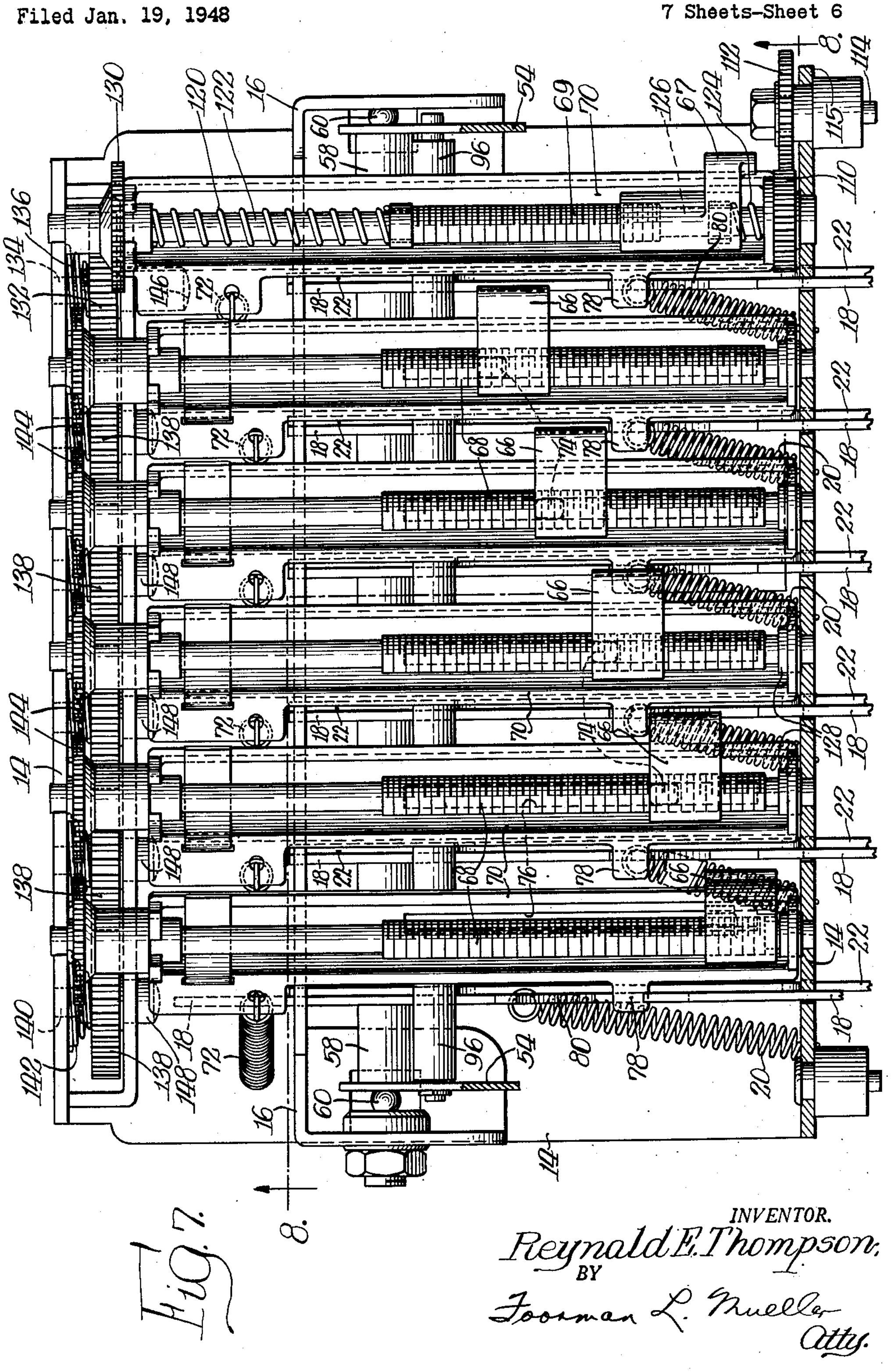
Fig. 7 is a horizontal section taken substantially on the line 7—7 in Fig. 2.

Links 48 are pivotally connected at their ends to shoulder rivets 50 and 52 respectively located on the arms 46 and on the free ends of rockable drive arms 54. Springs 56 are extended between the rivets 50 and 52 to hold these rivets tightly against the edges of the holes in the links 48, thereby maintaining a constant relationship between the carriage and the rocker arms 54. The drive arms 54 are pivotally supported by and secured to a rock shaft 58 extending along the bottom of the unit and journalled at its ends in ball bearings 60 carried by the bracket 16, as shown in Figs. 1 and 7. Coil springs 62 are extended respectively between the arms 54 and the frame piece 14 to bias the carriage structure 26 forwardly, or to the right as viewed in Fig. 6. If desired, one of these springs 62 may be omitted, provided the carriage structure is made sufficiently rigid.

Provision is made for selectively arresting the movement of the carriage 28 under the influence of the springs 62, thereby to adjust the positions of the movable cores 12 relative to the stationary coils of the tuning inductors 10 for determining the frequencies to which the receiver may be tuned automatically. To this end I have arranged carriage stops 66, Figs. 6, 7, and 8, on threaded shafts or screw members 68 which extend between and are rotatably mounted in the ends of the C-shaped frame piece 14. The stops 66 are threaded on the screws 68 and are capable of limited rotation thereon, into and out of the path of movement of the carriage 28. Each of the stops 66 is allocated respectively to one of the plungers 18 which support the automatic station-selecting push buttons, these being identified customarily by the call letters of radio stations.

Figure 8:
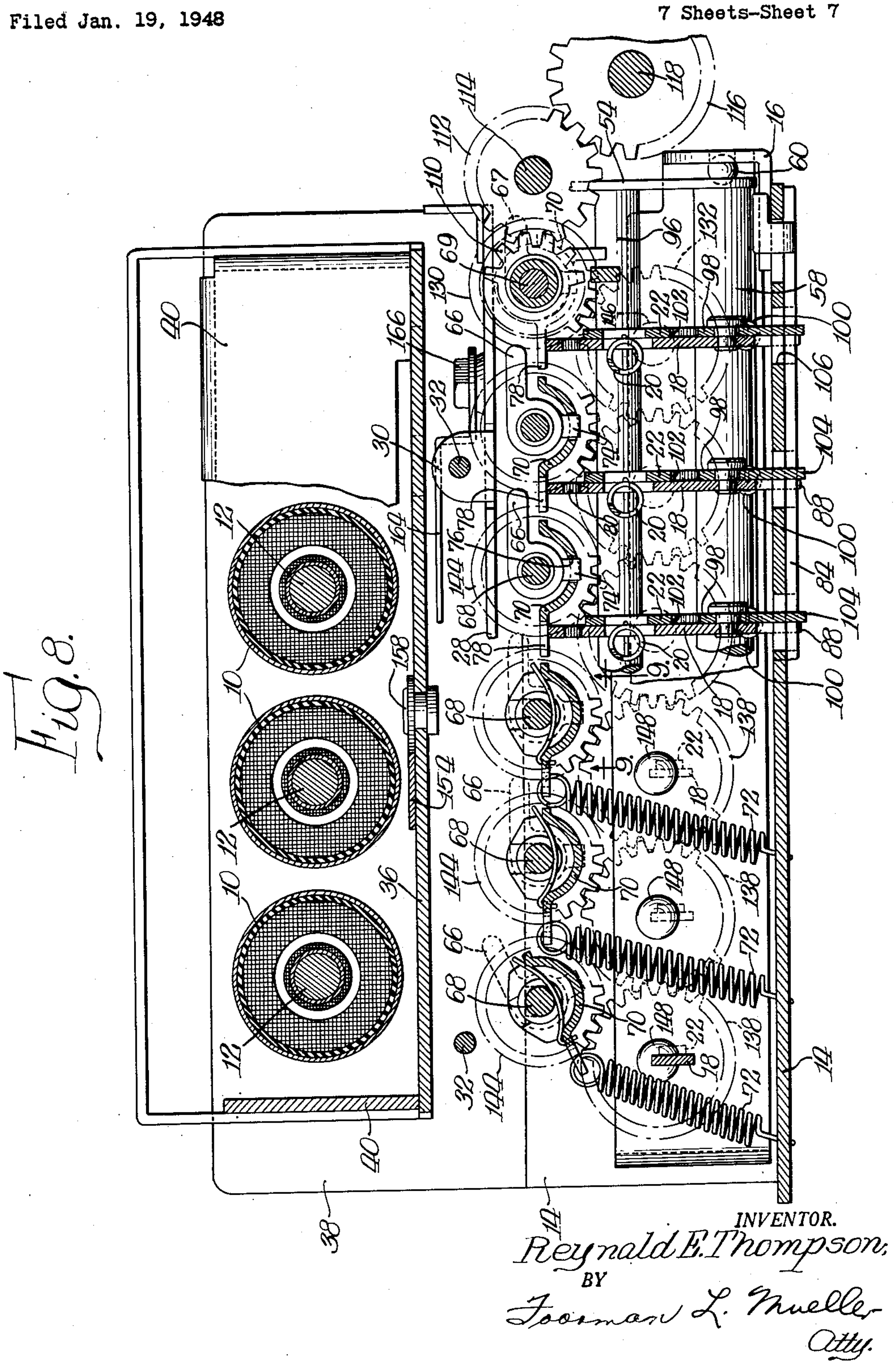
Fig. 8 is a sectional view on the line 8—8 in Fig. 7.

A special stop 67 and a screw member or shaft 69, Figs. 4, 7 and 8, are located at the right-hand side of the tuning unit. The stop 67 is allocated to a plunger 18 that carries a push button designated "Manual" (or the equivalent thereof) which is utilized in manually tuning the receiver independently of the automatic tuning devices.

Figure 9:
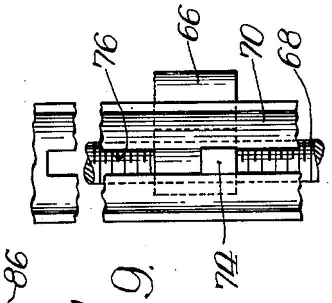
Fig. 9 is a fragmentary view taken on the line 9—9 in Fig. 8 and showing, in elevation, a carriage stop and certain associated parts.

Disposed adjacent each screw member 68 or 69 is a rocker 70 of elongated arcuate shape, which is pivotally supported at its ends on the screw member 68 or 69, as the case may be. Individual coil springs 72, best shown in Fig. 8, extend from ears on the rockers 70 to the frame piece 14. As shown in the detail view, Fig. 9, each stop 66 (or 67) has a lug or ear 74 thereon which is received in a longitudinally extending slot 76 in the rocker 70 adjacent thereto. Thus, as the stop is positioned longitudinally of the lead screw on which it is mounted, it may slide relative to the rocker 70 and yet be caused to turn, on its screw axis whenever the corresponding rocker 70 is actuated.

Each rocker 70 has an ear 78, Figs. 6, 7, and 8, which is urged against the edge of a plunger 18 by the spring 72 acting on this rocker. Normally, when the plunger 18 is in its extreme forward position to which it is urged by its spring 20, the ear 78 is positioned at the highest point on an incline 80 formed on the edge of the plunger 18. This causes the associated carriage stop 66 (or 67) to be positioned out of the path of travel of the carriage 28 (as in the case of the stops 66 and 67 in the right-hand portion of Fig. 8). When a plunger 18 is pushed in, however, the ear 78 on the associated rocker 70 rides down the incline 80, as shown in Fig. 6, whereupon the corresponding spring 72, Fig. 8, rotates the rocker 70 about the screw member 68 as an axis, thereby to dispose the stop 66 (or 67) in a position to arrest the carriage 28 when the latter moves forwardly.

Figure 3:
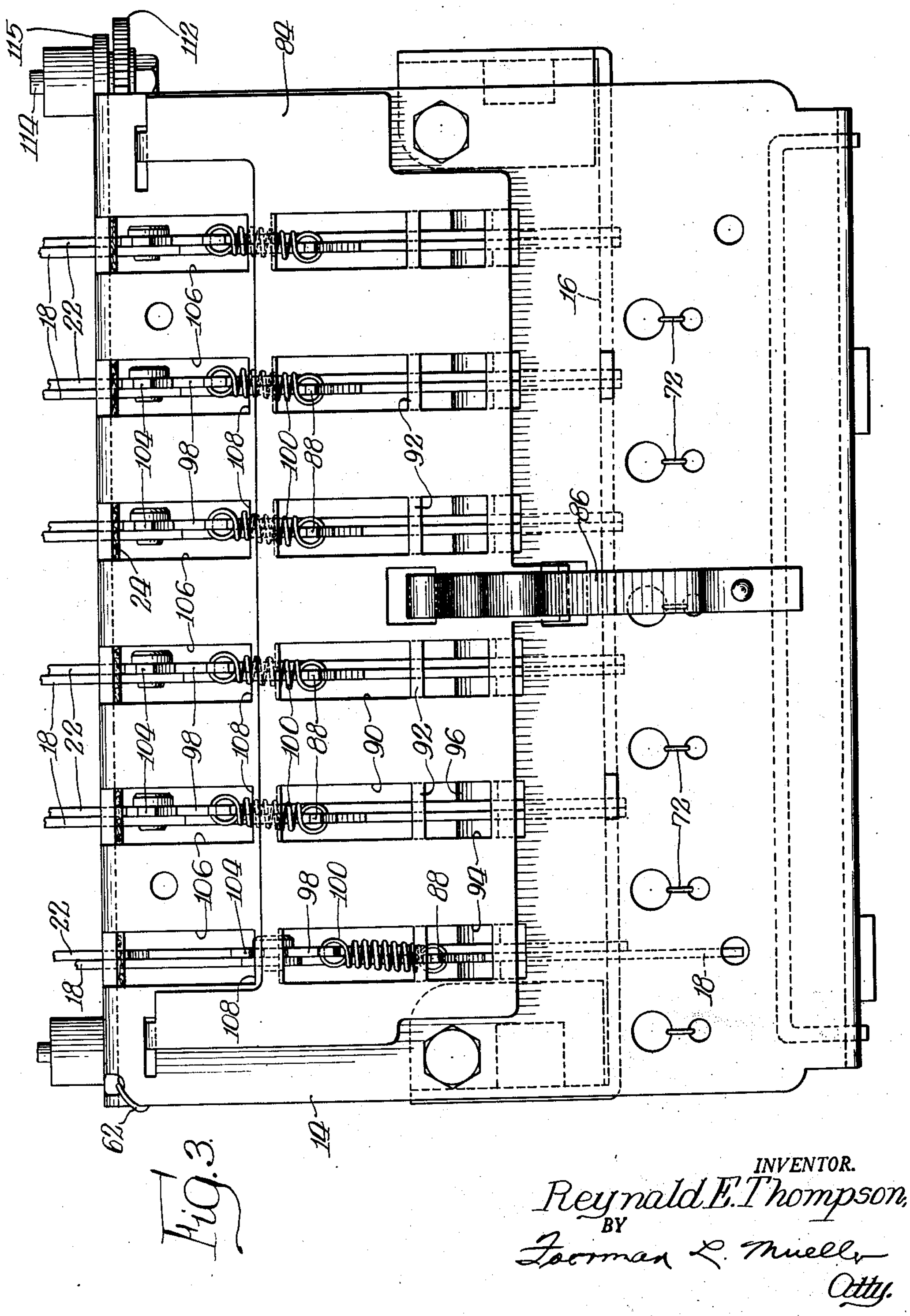
Fig. 3 is a bottom view of the unit.

Releasable latching devices are associated with the various plungers 18 so that as each plunger is pushed inwardly to an active position, it is automatically latched in such position, and any previously pushed plunger 18 is thereupon released to the action of its restoring spring. As shown in Figs. 3, 4 and 5, a latch plate 84 is pivotally mounted on the bottom of the frame piece 14 and is yieldingly urged upwardly by a leaf spring 86. Each plunger 18 has a dog 88 thereon which normally is received in an aperture 90 in the latch plate 84. When the plunger 18 is pushed, however, a cam edge on the dog 88 bears against a rib 92 on the plate 84, causing the plate 84 to pivot downwardly away from the frame piece 14. The continued inward movement of the plunger 18 causes the dog 88 to move past the rib 92 and enter another aperture 94 in the plate 84, enabling the latch plate to be restored by the spring 86. The dog 88 seats against the rib 92 when pressure is removed from the push button, and it keeps the plunger 18 latched until actuation of another plunger takes place. As the dog 88 of each actuated plunger 18 presses against the rib 92 to tilt the latch plate 84 as just described, the dog 88 of a previously actuated plunger 18 is disengaged from the corresponding rib 92, and the latter plunger is released. Thus, there can be only one plunger 18 latched-in at one time, provided that the push buttons are pressed consecutively and not simultaneously.

It has been mentioned hereinabove that the carriage structure 26 is caused to make an excursion back and forth each time a plunger is pressed inwardly. A rod 96, Figs. 1, 5, 6 and 8, extends between the drive arms 54 which carry the carriage structure 26, the ends of this rod 96 being rotatably received in the arms 54. Each of these slides 22 carried by the plungers 18 has a shoulder adapted to bear against the rod 96 when the plunger 18 is pushed inwardly. The slide 22 is connected to the plunger 18 by a pawl 98 pivotally mounted on a plunger 18 and normally urged by a small coil spring 100 into a notch or recess 102 in an edge of the slide 22. Each pawl 98 has a tail 104 extending to an aperture 106 (Fig. 3) in the frame piece 14. During the greater part of the inward travel of the plunger 18, the tail 104 travels along the aperture 106 and the pawl 98 is seated in the notch 102, so that the slide 22 is forced to travel with the plunger 18. Consequently, whichever slide 22 is actuated bears against the rod 96 and pushes the rocker arms 54 rearwardly, thus causing the carriage mechanism 26 to be cocked. Toward the end of the rearward travel of the plunger 18 and the carriage structure 26, the tail 104 of the pawl 98 strikes a rib 108 in the frame piece 14, and continued inward travel of the plunger 18 produces a rocking of the pawl 98 about its pivot so that the pawl becomes unseated from the recess 102 in the slide 22. Thereupon the restoring springs 62 of the carriage are effective to push the carriage structure 26 (as well as the now-released slide 22) forwardly again. The various positions which the rocker arms 54 and other carriage parts may occupy in the course of an excursion thereof are indicated in broken and full lines, respectively, in Fig. 4.

It will be seen from the foregoing that each actuation of a plunger 18 produces a back-and-forth excursion of the carriage 26. It will be recalled also that by pushing a plunger 18 inwardly, the associated stop 66 (or 67) is caused to occupy a carriage-arresting position. The carriage proper 28 is a substantially flat plate having a substantial width so that it would be impossible for a carriage stop to move into an interfering position in back of the carriage 28. If a carriage stop as 66 is released to the action of its spring 72 before the carriage 28 has travelled rearwardly a sufficient distance to clear the stop, the stop will merely bear against the side of the carriage until the latter has been moved rearwardly past the stop, whereupon the stop will immediately swing in front of the carriage to arrest the same on its return stroke.

As mentioned above, the carriage stops 66 (of which there are five in the illustrated embodiment) are respectively associated with automatic station-selecting push buttons and associated plunger devices of the tuning unit. These stops must be set up for arresting the carriage 28 at proper positions whereby the tuning slugs 12 are adjusted to the necessary frequencies for tuning in the desired stations. Before explaining the manner in which this is done, however, a description will first be given of the manual tuning arrangement, inasmuch as this arrangement is instrumental in setting up the other carriage stops.

A gear 110, Fig. 8, is fast on the screw member 69 just inside the front wall of the frame piece 14. This gear is meshed with an idler pinion 112 rotatably mounted on a stub shaft 114 journalled in an ear 115, Fig. 2, on the frame piece 14. The pinion 112 is adapted to mesh with a gear 116 (Figs. 2 and 8) on a manual tuning shaft 118 which usually is journalled in the chassis (not shown) of the radio set. This shaft 118 may be provided with a knob or other similar device to facilitate turning the shaft 118 by hand. For manual tuning of the receiver, the "manual" push button is pressed, causing the extreme right-hand plunger 18, as viewed in Figs. 1, 2 and 8, to move in and position the carriage stop 66 in carriage-arresting position. Then, as the manual tuning shaft 118 is turned, the screw 69 is caused to rotate, thereby moving the carriage stop 67 along the screw-threaded portion of the shaft 69. As is usual for each actuation of a push button, the carriage 28 is freed from the control of any previously active carriage stop and is brought against the newly selected stop (in this case, the stop 67). Hence, the carriage 28 will follow the movement of the stop 67 along the screw 69 in this operation, producing a continuous variation of the frequency to which the radio receiver is being tuned so long as the tuning knob is rotated.

If the stop 67 should attempt to travel rearwardly past the threaded portion of the shaft 69, further travel thereof is prevented by a coil spring 120 (Figs. 4 and 7) which is wound around and unthreaded end portion 122 of the shaft 69, this end portion 122 being of smaller diameter than the threaded portion. Therefore, any attempt to screw the stop 67 in farther than the extent of the threads on the shaft 69 will result merely in the compression of the coil spring 120 while it maintains the stop 69 against the inner end of the threaded portion of the shaft 69. Likewise, at the forward end of the screw 69 there is a coil spring 124 on a thinner, unthreaded portion 126 of the shaft 69. When the stop 67 reaches the forward end of its travel on the threaded portion of shaft 69, continued rotation of the shaft 69 in the same direction causes the stop 67 to ride off the threaded portion, but it will be held back against the end thread by the spring 124. In the case of the five lead screws or threaded shafts 68, each of the carriage stops 66 mounted thereon is limited in its forward motion by a lead screw shoulder 128 and in its backward motion by the length of the slot 76 in the rocker 70.

Adjacent the inside rear face of the frame piece 14 is disposed suitable gearing for selectively coupling the manually operated shaft 69 to the shafts 68, thereby to set up the carriage stops 66. A pinion 130, Figs. 4 and 8, fast on the inner end of the shaft 69 is adapted to mesh with a pinion 132 which is mounted on a shiftably supported stub shaft 134. A coil spring 136 disposed on the stub shaft 134 between the pinion 132 and the rear face of the frame piece 14 tends to urge the pinion 132 into a position where it is meshed with the pinion 130 on one side and with another pinion 138 on the other side. There are several of the pinions 138 (in this instance, five) which are mounted on shiftable stub shafts 140 that are urged by springs 142 forwardly so that normally all of the pinions 138 are in mesh with one another. Each of the stub shafts 140 may be pushed rearwardly to engage its pinion 138 with a pinion 144, Figs. 6 and 8, fast on the rear portion of one of the screw members 68.

Referring now to Fig. 4, when the push rod or plunger 18 which carries the "manual" push button is pressed in and latched, the inner end of this plunger strikes a button 146 on the forward end of the stub shaft 134 and pushes the shaft 134 and pinion 132 rearwardly to disengage the pinion 132 from the pinion 130. Hence, during manual tuning of the radio set, the lead screw 69 is disengaged from the train of gearing just described so that the frictional resistance to rotation of the screw is minimized. When one of the other push buttons is actuated, the plunger 18 just referred to is released, and the pinion 132 moves back into engagement with the pinion 130.

When a station-selecting push button is to be "set up," the button is pushed inwardly past its usual "latched-in" position, as far as it will go, and is held in that position manually. Depending upon which push buton is actuated, one of the plungers 18 will strike a button 148 on a stub shaft 140, Fig. 6, and push the stub shaft 140 and its associated pinion 138 rearwardly. This brings the pinion 138 into mesh with a pinion 144 of the lead screw 68 which is associated with the pushed-in plunger. When the pinions 138 are moved rearwardly in this fashion, they still remain in mesh with each other so that a continuous gear train is afforded from the selected pinion 144 to the driving pinion 130 on the manually actuated screw member or shaft 69. Hence, the selected screw member or shaft 68 may be rotated in unison with the shaft 69, causing the selected carriage stop 66 to travel along the threaded portion of the shaft 68. The carriage 28, meanwhile having been cocked and released as an incident to the actuation of the plunger 18, follows the motion of the selected carriage stop 66. Thus, the frequency to which the radio set is tuned by any of the station-selecting buttons may be varied by means of the manual tuning knob.

When the setting-up operation for a particular push button is completed, pressure is removed from that button, and the spring 20 acting thereon restores the plunger to its latched-in position, where it is held by the dog 88 until released. In this position of the plunger 18, it is disengaged from the stub shaft 140, enabling the spring 142 to disengage the pinion 138 from the gear 144, so that rotation of the manual tuning member has no further effect upon the setting of the carriage stop 66.

The foregoing operation of "setting up" a push button, that is, setting its associated carriage stop 66, may be repeated for other buttons until all the carriage stops 66 have been set into the requisite positions.

The carriage 28 of the tuner is connected to the mechanism which drives the pointer or dial indicator of the radio receiver. It is desirable that the pointer have a substantially straight-line motion which bears more or less of a proportionate relation to the displacement of the carriage from its fully-cocked position, and it is further desirable that the pointer be actuated to indicate the stations, channels or wave lengths selected by the listener irrespective of whether the tuner is being operated manually or automatically. For this purpose I have provided a mechanical movement which is best illustrated in Fig. 1, this movement being interposed between the carriage 28 and the pointer. A triangular lever 152, fulcrumed at 154 on the frame plate 36, is disposed immediately beneath an opening 150 in the plate 36. A second lever 154 is fulcrumed approximately at its mid point on the lever 152, as indicated at 156. The rearwardly extending portion of this lever 154 carries a pin 158 which is received in a slot 160 formed in the frame plate 36. The slot 160 extends parallel to the path of movement of the carriage 28, that is, straight rearwardly. Thus the rear end of the lever 154 is constrained to move in a straight-line path paralleling the path of the carriage 28. The forward end of the lever 154 terminates in a free end 162 which is connected to the pointer (not shown) cooperating with the dial of the radio receiver. A third lever 164 is fulcrumed at 166 on the carriage 28 and is pivotally connected to the lever 152 between (but not necessarily in alignment with) the lever fulcrums 156 and 154 thereon. This pivotal connection preferably is afforded by a pin or rivet 168 on the lever 152 received in a slot 170 in the lever 164. A leaf-spring 172 anchored to the frame piece 14 and acting upon the lever 152 tends to maintain the pin 168 seated in one end of the slot 170, yet permitting the pin 168 to ride along the slot 170 as the lever 164 reaches its extreme rearward position.

The lever arrangement just described affords a compound motion whereby the displacement of the carriage 28 is so related to the displacement of the pointer attached to the end 162 of the lever 154 that a true indication of the tuning is obtained. The various positions which these levers may occupy for different positions of the carriage 28 are shown in broken and full lines, respectively, in Fig. 1. The restoring springs 62 for the carriage 28 tend to urge the pointer mechanism to the left (as viewed in Fig. 1) while the carriage is travelling forwardly. The pointer is moved to the right when the carriage is travelling rearwardly.

The above-described tuning apparatus greatly expedites automatic tuning operations in radio receivers and the like. The mechanism functions quietly and accurately. Setting-up of the push buttons is accomplished with ease merely by pushing each button in turn to the extreme limit of its inward travel, beyond its "latched-in" position, and turning the manual tuning knob until the desired setting is achieved. The dial pointer always indicates the tuning of the receiver for both automatic and manual tuning operations. While the tuner has been illustrated and described as being mounted so that the push buttons are in a horizontal row, it may be positioned also with the buttons aligned vertically.

While a preferred embodiment of the invention has been disclosed herein, such embodiment obviously is capable of modification without departing from the spirit of the invention, and it is intended to cover all such modifications by the appended claims.

I claim:

1. In an automatic tuner having movable tuning elements and a plurality of push buttons for the selective positioning of said elements, the combination of a spring-biased carriage operatively connected to the tuning elements, a plurality of carriage stops each movable into a position for arresting said carriage, a plurality of plunger devices respectively supporting said push buttons, each of said plunger devices having a first portion cooperating with a respective one of said stops for causing such stop to occupy its carriage-arresting position as an incident to actuation of the plunger device, and a second portion cooperating with said carriage to produce an excursion of said carriage backwardly to a predetermined position and then forwardly into engagement with the stop which is in carriage-arresting position, said second portion being releasable from said first portion, and means for automatically releasing said second portion from said first portion at the limit of the backward movement of said carriage whereby said carriage is able to move forwardly while said first portion is maintaining said stop in the carriage-arresting position thereof.

2. In an automatic tuner having movable tuning elements and a plurality of push buttons for the selective positioning of said elements, the combination of a carriage operatively connected to the tuning elements, a plurality of carriage stops, yieldable means normally tending to urge each of said stops into a position for arresting said carriage, and a plurality of plunger devices respectively supporting said push buttons, said plunger devices having first portions cooperating respectively with said stops for maintaining said stops away from their carriage-arresting positions except when the plunger devices are pushed in, each of said plunger devices also having a second portion cooperating with said carriage and effective when such device is pushed in to produce an excursion of said carriage backwardly to a predetermined position and then forwardly into engagement with the stop which is in carriage-arresting position.

3. In an automatic tuner having movable tuning elements, a plurality of push-button devices, interlocking means whereby each of said devices is held latched in when pushed and is released when another of said devices is pushed, and means to restore the released push-buttons; the combination comprising a spring-biased carriage operatively connected to the tuning elements, a plurality of carriage stops, yieldable means normally tending to urge each of said stops into a position for arresting said carriage, first members actuated by the push-button devices and respectively cooperating with said stops to maintain said stops away from their carriage-arresting positions, said first members respectively being ineffective when the corresponding bush-button devices are latched in, and second members on said push-button devices cooperating with said carriage to produce an excursion of said carriage backwardly to a predetermined position and then forwardly as an incident to the actuation of a push-button device, said carriage having a dimension in the direction of its travel greater than the maximum displacement between stops so as to prevent the movement of a stop into its carriage-arresting position until said carriage has cleared the stop in the course of moving rearwardly.

4. In an automatic tuner having movable tuning elements and a plurality of push buttons for the selective positioning of the tuning elements, the combination of a carriage operatively connected to the tuning elements, resilient means biasing said carriage forwardly, a plurality of carriage stops each movable into a position for arresting said carriage in its forward motion, a plurality of plungers respectively supporting said push buttons, each of said plungers having a portion cooperating with a respective one of said stops for causing such stop to occupy its carriage-arresting position when the plunger is pushed rearwardly, a plurality of slides respectively mounted on said plungers and releasably coupled thereto, each of said slides being adapted to cooperate with said carriage to retract said carriage rearwardly when the corresponding plunger is pushed, and releasing mechanism effective on said slides for releasing said carriage to the action of said resilient means at the end of its rearward stroke, while said plunger remains pushed in.

5. In an automatic tuner having movable tuning elements and a plurality of push buttons for the selective positioning of the tuning elements in predetermined positions, the combination of a carriage mechanism operatively connected to the tuning elements, carriage stop mechanism including a plurality of carriage stops each rotatably mounted on a shaft, adjusting members for positioning said stops selectively lengthwise of their shafts, a plurality of elongated rockers respectively extending substantially parallel to said shafts, said stops having sliding connections with said rockers, and a plurality of plunger devices respectively supporting said push buttons, each of said plunger devices having a first portion engageable with a respective one of said rockers for pivoting the same when the corresponding push button is pressed, thereby to cause the respective stop to be moved into its carriage-arresting position, and a second portion cooperating with said carriage mechanism for producing a back-and-forth excursion of the carriage as an incident to pressing the push button.

6. In an automatic tuner having movable tuning elements, at least two push buttons, and a manually rotatable member; the combination of a carriage mechanism operatively connected to the tuning elements, carriage stop mechanism including two carriage stops respectively mounted rotatably on shafts, adjusting members for positioning said stops selectively lengthwise of their shafts, motion-transmitting means between said manually rotatable member and one of said adjusting members, normally disengaged motion-transmitting devices between the manually rotatable member and the other of said adjusting members, elongated rockers respectively extending substantially parallel to said supports, said stops having sliding connections with said rockers, and two plunger devices respectively supporting said push buttons, each of said plunger devices having a first portion engageable with a respective one of said rockers for pivoting the same when the push button is pressed, thereby to cause the respective stop to be moved into its carriage-arresting position, and a second portion cooperating with said carriage mechanism for producing a back-and-forth excursion of the carriage as an incident to pressing the push button, the plunger device for one of said push buttons also controlling said normally disengaged motion-transmitting devices and having an optional position for effecting engagement thereof.

7. The combination set forth in claim 6, wherein the other of said plunger devices is arranged to disengage the last-mentioned motion-transmitting devices when the other of said push buttons is pressed.

8. In an automatic tuner for a radio receiver, movable tuning elements, a carriage for moving said elements, a push-button mechanism including settable stops for placing said carriage in any of a plurality of preselected positions, a rotary device manually operable for placing said carriage selectively in any position within a given range including said preselected positions, a plurality of screw members respectively arranged to adjust the positions of said stops along the path of said carriage, trains of gearing between said rotary device and said screw members whereby said rotary device may drive said screw members, and gear shifters under the control of said push-button mechanism for selectively rendering said trains of gearing effective.

9. In an automatic tuner for a radio receiver, movable tuning elements, a spring-biased carriage for moving said elements, push-button devices, settable stops for arresting said carriage in any of a plurality of preselected positions, each of said stops being movable into and out of a carriage-arresting position, stop-actuating members respectively associated with said stops for individually moving the stops into and out of their carriage-arresting positions under control of said push-button devices, screw-threaded stop-setting members stationarily mounted and separate from said push-button devices, a manual control device separate from said push-button devices for placing said carriage selectively in any position within a given range including said preselected positions, and shiftable coupling devices selectively engageable to establish operative connections between said manual control device and said stop-setting members for enabling said manual control device to adjust the settings of said stops individually, each of said push-button devices having a first active position for moving a respective one of said stop-actuating members to place the corresponding stop into its carriage-arresting position, and a second active position beyond said first active position for shifting certain of said coupling devices into an operative connection between said manual control device and a respective one of said stop-setting members.

10. In an automatic tuner for a radio receiver, movable tuning elements, a carriage for moving said elements, station-selecting push-button devices, settable stops for retaining said carriage in any of a plurality of preselected positions under control of said push-button devices, manually rotatable means for placing said carriage selectively in any position within a given range including said preselected positions, a plurality of screw members respectively arranged to adjust the positions of said stops along the path of said carriage, elongated rockers pivotally mounted on said screw members, said stops being threaded on said screw members and having portions slidingly connected with said rockers, portions on said push-button devices cooperating with said rockers for turning said stops into and out of their carriage-engaging positions depending upon the actuation of the push-button devices, trains of gearing between said manually rotatable means and said screw members whereby said rotatable means may drive said screw members rotatively to adjust said stops, and gear shifters under control of said push-button devices for selectively rendering said trains of gearing effective.

11. In an automatic tuner for a radio receiver, tuning elements having rectilinearly movable portions, a carriage operatively connected to said movable portions, a plurality of station-selecting push-button devices, a "manual" push-button device, a plurality of screw members one for each of said push-button devices and extending parallel to the direction of movement of said carriage, a plurality of carriage stops respectively threaded on said screw members, a manually rotatable member operatively connected to one of said screw members for turning the same when such member is rotated, a plurality of gear trains for respectively coupling said one screw member to the remaining screw members, certain of the gears in said trains being shiftable into and out of an operative relation for rendering said trains selectively effective, gear shifters respectively controlled by said station-selecting push-button devices for selectively establishing operative connections through said gear trains between said one screw member and the remaining screw members to enable said stops to be set by said manually rotatable member, rockers pivotally mounted adjacent said screw members, said stops respectively having sliding connections with said rockers, and portions on all said push-button devices cooperating respectively with said rockers and with said carriage whereby said stops are selectively positioned to engage said carriage under control of said push-button devices, and said carriage is caused to make a single excursion for each actuation of a push-button device.

12. A tuner as set forth in claim 11, including a gear shifter under control of said "manual" push-button device and effective when such device is actuated to disengage said one screw member from all of said gear trains.

13. In a push-button mechanism having a plurality of buttons that may be pushed selectively into active positions, each button when pushed being latched in an active position and effecting restoration of any previously pushed button to its inactive position, the combination therewith of a carriage biased to move in a given direction, a plurality of stops respectively settable to arrest said carriage in various preselected positions, said stops normally being disengaged from said carriage, stop-controlling devices connecting each of said push buttons with a respective one of said stops to condition each stop for arresting said carriage as the corresponding push button is actuated, and carriage-actuating devices connecting each of said push buttons with said carriage to produce a single back-and forth excursion of said carriage to bring said carriage against the conditioned one of said stops while travelling in said given direction.

14. In a push-button mechanism having a plurality of buttons that may be pushed selectively into active positions, each button when pressed being latched in an active position and effecting restoration of any previously pushed button to its inactive position, the combination therewith of a spring-biased carriage, a plurality of stops respectively settable to arrest said carriage in various preselected positions, said stops normally being disengaged from said carriage, stop-controlling devices connecting each of said push buttons with a respective one of said stops to condition each stop for arresting said carriage as the corresponding push button is actuated, a plurality of carriage-actuating devices one for each of said push buttons, and connecting devices respectively coupling said carriage-actuating devices with said push buttons to cock said carriage whenever a push button is pressed, said connecting devices being releasable to uncouple said carriage-actuating devices from said push-buttons, tripping means for automatically releasing any of said connecting devices when the carriage is fully cocked, thereby to release said carriage for movement into engagement with said one of said stops corresponding to the actuated push button.

15. In a tuner for a radio receiver, a plurality of automatic station-selecting push buttons, releasable latching means effective when any of said buttons is pushed inwardly for holding such button in a predetermined position and for releasing any previously pushed button, a carriage, a plurality of settable carriage stops respectively related to said push buttons, rotary adjusting devices for setting said stops, a manually rotatable element for driving said rotary adjusting devices, shiftable couplers interposed between said rotatable elements and said adjusting devices and arranged to be actuated respectively by said push buttons, each of said couplers being rendered effective when its corresponding button is pushed inwardly to an extreme position, and a resilient member for urging each button from its extreme inward position to said predetermined position thereof thereby to disengage the related coupler upon the removal of external pressure from the button.

16. In an automatic tuner having movable tuning elements and a plurality of push buttons for the selective positioning of said elements, the combination of a spring-biased carriage operatively connected to the tuning elements, a plurality of carriage stops each movable into a position for arresting said carriage, a plurality of plunger devices respectively supporting said push buttons, each of said plunger devices having a first portion cooperating with a respective one of said stops for causing such stop to occupy its carriage-arresting position as an incident to actuation of the plunger device, and a second portion cooperating with said carriage to produce a movement of said carriage against the spring bias thereof to a given position as said plunger device is actuated to a predetermined position thereof, and tripping means for releasing said carriage to the action of its spring bias as said carriage attains said given position thereof while said first portion of the actuated plunger device is in said predetermined position thereof, thereby enabling said carriage to move until arrested by the stop which is in carriage-arresting position.

17. In an automatic tuner for a radio receiver, movable tuning elements, a carriage for moving said elements, station-selecting mechanism including a plurality of reciprocable plungers and a corresponding plurality of settable stops for placing said carriage in any of a plurality of preselected positions, each of said plungers being movable to a given position for bringing said carriage against the respective stop associated with such plunger, a manual control device separate from said station-selecting mechanism for placing said carriage selectively in any position within a given range including said preselected positions, a plurality of shiftable coupling devices for respectively establishing operative connections between said manual control device and said stops for enabling said manual control device to adjust the settings of said stops individually, thereby to determine the positions at which said carriage may be placed by said station-selecting mechanism, each of said coupling devices normally being biased to a disengaged position, each of said plungers having a portion thereof adapted to produce operative engagement of the respective coupling device only when such plunger is moved to an extreme position beyond said given position thereof, and means normally biasing each of said plungers away from said extreme position thereof.

18. In a push-button tuner having a carriage which is movable back and forth in a given straight path for adjusting the positions of tuning elements in response to the actuation of push buttons in the tuner, and in which a pointer is movable in a rectilinear path substantially at right angles to the path of the carriage, mechanism for connecting the pointer to the carriage to indicate the frequencies to which the tuning elements are tuned, such mechanism comprising a first lever having a stationary fulcrum, a second lever fulcrumed on said first lever, a stationary frame having a slot therein extending parallel to the path of the carriage, said second lever being connected on one side of its fulcrum to the pointer and having a portion on the other side of its fulcrum received in said slot, and a third lever fulcrumed on the carriage and having a lost-motion pivotal connection with said first lever intermediate the aforesaid fulcrums of said first lever.

REYNALD E. THOMPSON.

REFERENCES CITED

The following references are of record in the file of this patent:

UNITED STATES PATENTS

| Number | Name | Date |
|---|---|---|
| 2,214,506 | Manning et al. | Sept. 10, 1940 |
| 2,267,474 | McGarvey | Dec. 23, 1941 |
| 2,313,653 | Lyman | Mar. 9, 1943 |
| 2,320,893 | Schwarz et al. | June 1, 1943 |
| 2,338,533 | Pash | Jan. 4, 1944 |
| 2,400,193 | Cramer | May 14, 1946 |
| 2,453,187 | Blain | Nov. 9, 1948 |